US006950928B2

(12) United States Patent
Ronen et al.

(10) Patent No.: US 6,950,928 B2
(45) Date of Patent: Sep. 27, 2005

(54) APPARATUS, METHOD AND SYSTEM FOR FAST REGISTER RENAMING USING VIRTUAL RENAMING, INCLUDING BY USING RENAME INFORMATION OR A RENAMED REGISTER

(75) Inventors: Ronny Ronen, Haifa (IL); Adi Yoaz, Austin, TX (US); Gregory Pribush, Beer Sheva (IL)

(73) Assignee: Intel Corporation, Santa Clara, CA (US)

( * ) Notice: Subject to any disclaimer, the term of this patent is extended or adjusted under 35 U.S.C. 154(b) by 409 days.

(21) Appl. No.: 09/822,938

(22) Filed: Mar. 30, 2001

(65) Prior Publication Data

US 2002/0144090 A1 Oct. 3, 2002

(51) Int. Cl.$^7$ .............................. G06F 9/38; G06F 9/50
(52) U.S. Cl. ...................................... 712/217; 712/216
(58) Field of Search ................................ 712/216, 217

(56) References Cited

U.S. PATENT DOCUMENTS 5,337,415 A * 8/1994 DeLano et al. ............. 712/213
5,812,812 A * 9/1998 Afsar et al. ................. 712/216

OTHER PUBLICATIONS

Gonzalez et al., "Virtual–Physical Registers", Proceedings of the Fourth Annual Symposium on High–Performance Computer Architecture, Jan. 31–Feb. 4, 1998, pp. 175–184.*

Computer Architecture A Quantitative Approach, David A Patterson and John L Hennessy, 1996, Morgan Kaufman Publishers, Inc, 2nd Edition, pp. 232–234 and 251–261.*
Improving Superscalar Instruction Dispatch and Issue by Exploiting Dynamic Code Sequences; Vajapeyam, S. and Mitra, T.; Computer Architecture, 1997; Publication Date: Jun. 2–4, 1997; On pages(s): 1–12.*
Aggressive dynamic execution of multimedia kernel traces; Bishop, B., Owens, R., and Irwin, M.J.; Parallel Processing Symposium, 1998; Publication Date: Mar. 30–Apr. 3, 1998; On pp.: 640–646.*
The Authoritative Dictionary of IEEE Standard Terms, $7^{th}$ edition, IEEE, 2000, p. 693.*
Computer Organization and Design—The Hardware/Software Interface; Hennessy, J and Patterson, D; Morgan Kaufman Publishers Inc.; $2^{nd}$ Edition; 1998; p. 351.*
"The Fourth International Symposium On High–Performance Computer Architecture", Jan. 31–Feb. 4, 1998, Las Vegas, Nevada.. "Virtual–Physical Registers", A. González, J. González and M. Valero.

* cited by examiner

Primary Examiner—William M. Treat
(74) Attorney, Agent, or Firm—Kenyon & Kenyon

(57) ABSTRACT

A method for renaming a source for use with a processor, the method including providing an instruction, building instruction dependency information based on the instruction, caching the instruction based on the instruction dependency information to provide a cached instruction, renaming a register based on the cached instruction to provide a renamed register, and multiplexing the instruction dependency information and the renamed register to rename the source.

34 Claims, 6 Drawing Sheets

APPARATUS, METHOD AND SYSTEM FOR FAST REGISTER RENAMING USING VIRTUAL RENAMING, INCLUDING BY USING RENAME INFORMATION OR A RENAMED REGISTER

FIELD OF THE INVENTION

The present invention concerns an apparatus, method and system for providing fast register renaming using virtual renaming.

BACKGROUND INFORMATION

Register renaming is believed to affect the performance of dynamically scheduled processors or out-of-order execution processors. A dynamically scheduled processor is able to execute instructions out-of-order, which should result in fewer constraints on the issue order of instructions than for an in-order execution processor, and which should provide higher instruction-level parallelism (ILP). A dynamically scheduled processor should obey instruction dependencies, however, and therefore may not have complete freedom to select the execution order of instructions. These dependencies may include data dependencies (which may occur when one instruction produces a value that is used by another instruction), name dependencies (which may be caused by reusing storage locations, such as, for example, registers and memory), and control dependencies (which may be associated with conditional branches).

Dynamic register renaming may be used to eliminate name dependencies through registers by providing multiple storage locations for the same register name and keeping track of which storage location is referred to by each different instance of the same name. In this context, the name of a register may be referred to as a logical register, and the physical location to which it is mapped at a particular time may be referred to as a physical register. The amount of physical storage available for register renaming determines the maximum number of simultaneously "live" values, and therefore may limit the instruction window size.

Register renaming may, however, limit performance in microprocessors. In particular, priority or prioritized content-addressable-memories ("CAM") may be used to rename several instructions in a cycle, where each instruction may access results renamed in previous cycles or may access results of previous instructions renamed in the same cycle. Register renaming may be used by out-of-order processors to handle write-after-write ("WAW") and write-after-read ("WAR") problems to the extent that they may occur, and may be used for providing recovery in case of branch misprediction or incorrect speculation. A scheduler may use register renaming information to perform the task of instructions scheduling. The register renaming of a number N of instructions simultaneously may include four (4) steps as follows:

First, the system allocated "n" destination registers (which may be referred to as Physical Destinations or PDsts) for each instruction in the rename window. The Physical Destination Registers (PDsts) may or may not be allocated sequentially. In this regard, for example, sequential allocation of the Physical Destination Registers (PDsts) may not be performed when a common register file is used for both committed and non-committed results (which may be problematic, for example, for replay machines having separate register files for committed and non-committed results). Next, the system determines the dependency chain between these n instructions. If the instruction does not depend on any previous instructions in the rename window, the physical source register ("PSrc") is assigned according to the logical source register ("LSrc") from a register alias table ("RAT"); otherwise, the physical source register (PSrc) is assigned as the physical destination as the Physical Destination Register (PDst) of the instruction upon which the renamed instruction depends. Finally, the register alias table (RAT) may be updated according to the mapping of the registers.

This algorithmic approach may, however, limit the clock speed when a sufficient number of instructions (more than about 3 or 4) are being renamed in a single clock cycle. In particular, in the renaming algorithm, the second and fourth steps may use prioritized content-addressable-memories (CAMs) for determining the dependency chain and for updating the register alias table (RAT). Since prioritized content-addressable-memories (CAMs) may operate sequentially, it is believed that they may substantially slow down or at least be negatively affected as the number of instructions being renamed increases.

In out-of-order execution processors, instructions may be committed in-order, and instructions (after being decoded) may be retained in the instruction re-order buffer (ROB) until they are committed. The size of the re-order buffer (ROB) determines, or at least affects, the maximum number of "in-flight" instructions or instruction window. That is, the size of the re-order buffer (ROB) corresponds to or is the size of the instruction window. In short, the instruction window may be defined as the set of instructions from the oldest uncommitted instruction to the latest decoded instruction.

Register renaming may be used to remove name dependencies through registers, and this may be done by allocating a free storage location for the destination register of every new decoded instruction. Thus, different physical destination registers may be allocated even if the architectural name is the same. One renaming approach involves the entries of the re-order buffer (ROB), in which the result of every instruction is kept in the re-order buffer (ROB) until it is committed, after which it is written in the register file. When an instruction is decoded, the available source operands are read either from the register file or from a re-order buffer (ROB) entry. Operands that are not ready at decode may be forwarded from the execution units to the corresponding instruction queue entries (reservation stations) when they are produced. When an instruction is committed, its result may be copied from the re-order buffer (ROB) to the "real" register file. In another variation, a register buffer may be used just for renaming.

Another renaming approach may use a physical register file that contains more registers than are defined in the instruction set architecture (ISA), and these registers may be referred to as logical registers. In the decode stage, each logical register may be mapped to a physical register using a map table. The destination register may be mapped to a free physical register, and source registers may be translated to their last assigned mapping. When an instruction is committed or retired, the physical register allocated by the previous instruction with the same logical destination register becomes free. In this approach, since it should eliminate any need to copy registers on retirement, the operands may be read from the physical register file, which may be more efficient than for the re-order buffer (ROB) entry approach. The approach involves having one "pull" of information from the architectural and/or physical registers, and the retirement or "commitment" changes the allocation map to reflect it.

Additionally, to take advantage of a particular instruction window size in the physical register file organization approach, a number of physical registers should be about the same as the number of logical registers and the window size, since most or at least a significant number of the instructions may have a destination register. (That is, the maximum number of physical registers should be equal to the number of architectural plus the size of the instruction window, but a lower number may be used with virtual renaming. The logical register has to be "live" in case of branch misprediction. The rest are for maintaining "in-flight values".) It is believed that this is because each logical register may be mapped to a physical register when the instruction window is empty (such as may occur, for example, after a branch mis-prediction). Thus, the minimum number of physical registers that are used is at least the same as the number of logical registers. In addition, for every instruction whose destination operand is a register, an additional register may be allocated when it enters the window (decode stage) and a physical register may be released when it leaves the window (commit stage).

As regards all of the above, it is not believed that any of these systems, as well as virtual renamers alone, reflect the advantages, apparatuses, arrangements, methods, structures or topologies of the exemplary embodiments and methods of the present inventions, as are described below in the context of and with the use of virtual renamer apparatuses, arrangements, methods, structures or topologies.

DETAILED DESCRIPTION

By combining the use of a trace cache and virtual renaming, it is believed that renaming speeds may be improved. This involves performing renaming within a trace when the trace of an instruction is being built, using relative virtual renamed register numbers. When the trace is fetched, sources generated from previous traces may be renamed using the register alias table (RAT) in the suitably appropriate ways described herein. Additionally, sources generated with the trace are updated by adding, logically OR-ing, concatenating or otherwise combining the relative virtual register number to a base of allocated virtual register numbers. In this way, it is believed that a larger number of registers may be virtually allocated and renamed every cycle, which it is believed should increase the instruction bandwidth out of the trace cache.

Figure 1:
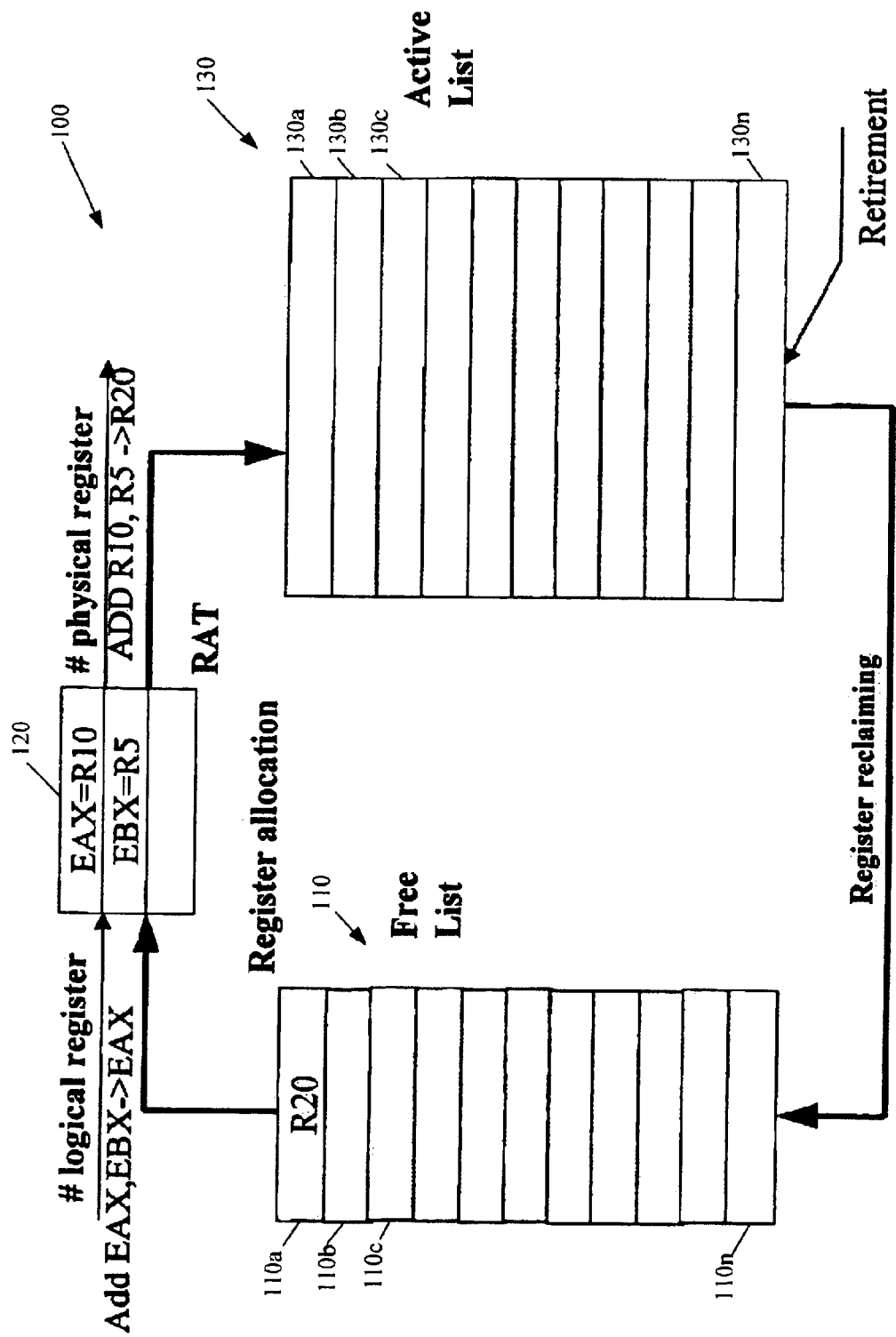
FIG. 1 shows a renaming method, in which the registers only move to the free list when the instruction that obsoletes the registers retires.

By way of further background explanation, in FIG. 1 is shown an exemplary renaming apparatus and method 100 (a combined list approach), in which registers may move to a free list only when the instruction that obsoletes or replaces them is retired. As shown, allocations of physical registers (including, for example, physical register R20) are performed on the free registers 110a, 110b, 110c, . . . , 110n listed in a free register list 110. Also as shown, an, instruction, such as "Add EAX, EBX→EAX", may be processed in connection with the register alias table (RAT) 120. In particular, the register alias table (RAT) 120, using the logical register numbers, may allocate, for example, physical destination registers R5 and R10 to logical registers EBX and EAX, respectively. Thus, the instruction (using the physical register numbers) may be, for example, "ADD R10, R5→R20", in which the contents of physical registers R5 and R10 are added, and the results of which are provided to physical register R20. This information is then provided to the active register list 130, which lists active registers 130a, 130b, 130c, . . . , 130n. As shown, the system retires physical registers from the active register list 130, and the system may reclaim any retired physical registers as free physical registers for the free physical register list 110.

Figure 2:
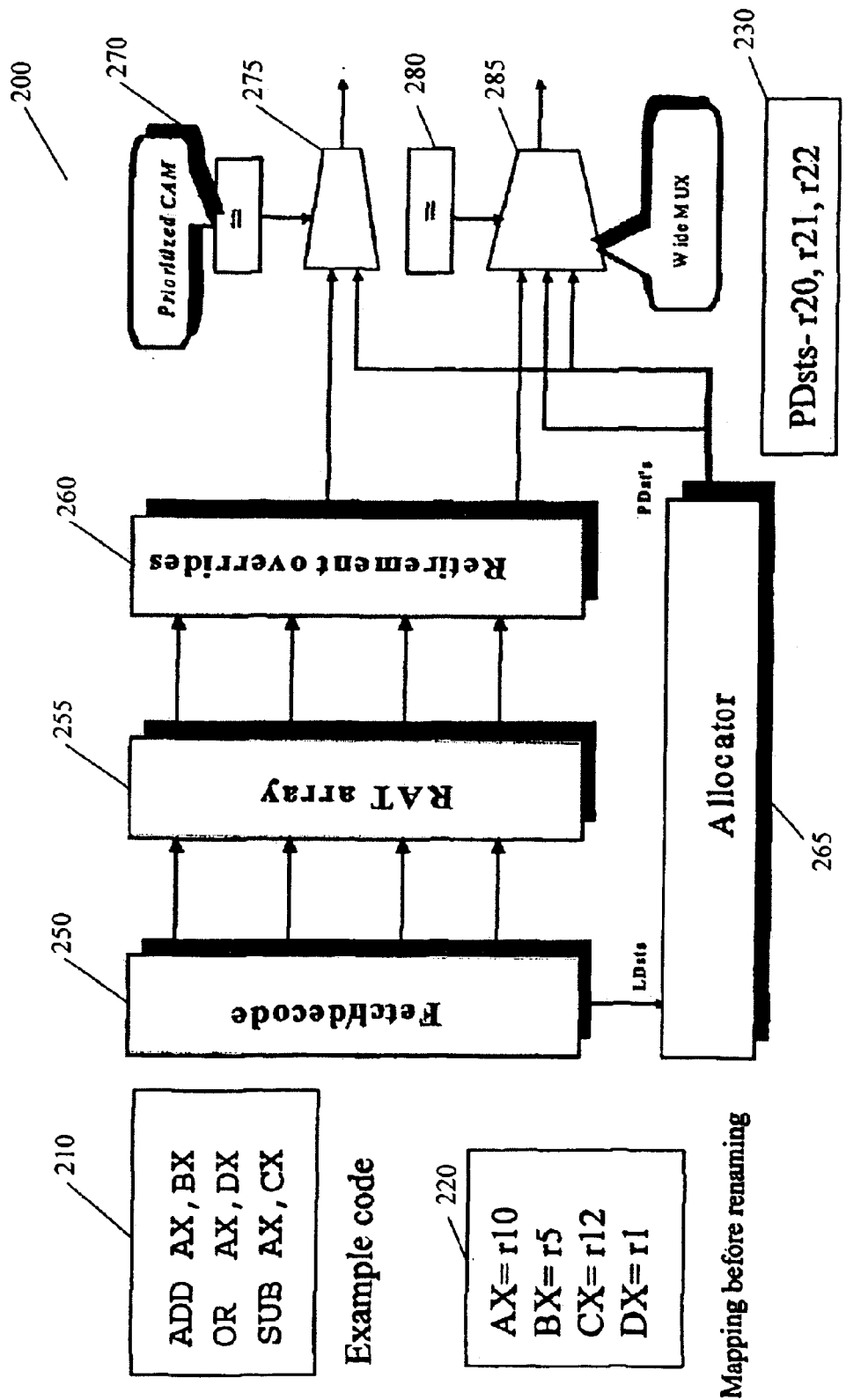
FIG. 2 shows an exemplary implementation of a renamer apparatus, method and system for use with the exemplary fast renamer apparatus, arrangement, method and system of FIG. 5 and/or FIG. 6.

Also, in FIG. 2 is shown an exemplary integer renamer arrangement and method 200, in which separate register files are provided for both the committed and non-committed results, and in which retirement overrides may be used to designate registers that contain committed results. If a processor is also provided with a combined committed and non-committed register file, it may use an analogous integer renamer. In both cases, it must be determined whether the source is from the present cycle or a previous one.

As shown, the integer renamer 200 includes a fetch/decode arrangement 250, a register alias table (RAT) array arrangement 255, a retirement override arrangement 260, an allocator arrangement 265, a prioritized content-addressable-memory (CAM) arrangement 270, a multiplexing arrangement 275, another prioritized content-addressable-memory (CAM) arrangement 280, and a relatively wide multiplexing arrangement 285. In the example c ode 210, there may be instructions for performing operations in logical source registers, such as, for example, EAX, EBX, ECX and EDX, where the instructions may be, for example, "ADD EAX, EBX-EAX", "OR EAX, EDX→EAX" and "SUB EAX, ECX→EAX". The logical source registers EAX, EBX, ECX and EDX may be mapped before being renamed in mapping block 220, in which the logical source registers EAX, EBX, ECX and EDX are mapped to physical registers R10, R5, R12 and R1, respectively.

In particular, the fetch/decode arrangement 250 is used for fetching and decoding the instruction code, such as, for example, the example code 210. The fetch/decode arrangement 250 provides the fetched and decoded instructions to the register alias table (RAT) array arrangement 255, and also provides the logical source destinations (LDsts) to the allocator arrangement 265. As shown, the allocator arrangement 265 allocates the logical destinations (LDsts) to the physical destinations (PDsts) (such as, for example, physical register destinations R20, R21 and R22 of physical register destination block 230). The register alias table (RAT) array arrangement 255 provides virtual register information to the retirement overrides arrangement 260, in which retirement overrides may be used to designate registers having committed results. As discussed, processors having a combined committed and non-committed register file may use an analogous integer renamer.

The multiplexing arrangement 275 receives the information from the prioritized content-addressable-memory (CAM) arrangement 270, the physical register destination (PDst) from the allocator arrangement 265, and the source information of the instructions from the retirement overrides arrangement 260, and provides information (associated with, for example, an instruction) for assigning physical sources. Likewise, multiplexing arrangement 285 receives the information from the prioritized content-addressable-memory (CAM) arrangement 280, the physical register destination (PDst) from the allocator arrangement 265, and the source information of the instructions from the retirement overrides arrangement 260, and provides information (associated with, for example, another instruction) for assigning physical sources.

A renaming process in an out-of-order processor provides the features of holding temporary uncommitted results and dependency chain tracking for scheduling. Since renaming approaches may use one only ID for both tasks, namely holding temporary uncommitted results and dependency chain tracking for scheduling, it is believed that this may waste processor or CPU resources, since temporary storage may be needed only after a result is computed. In virtual renaming, the tasks may each be provided with their own ID. During the renaming phase, the instructions receive a "virtual-physical register" ID that is not directly associated with any physical result storage. The system also maintains a physical map table for mapping "virtual-physical" registers into real physical registers. So that the system may know the real physical register during the rename stage, the instruction receives the real register number (and not a "virtual-physical"ID) and may also receive a bit(s) indicating this information.

Figure 3:
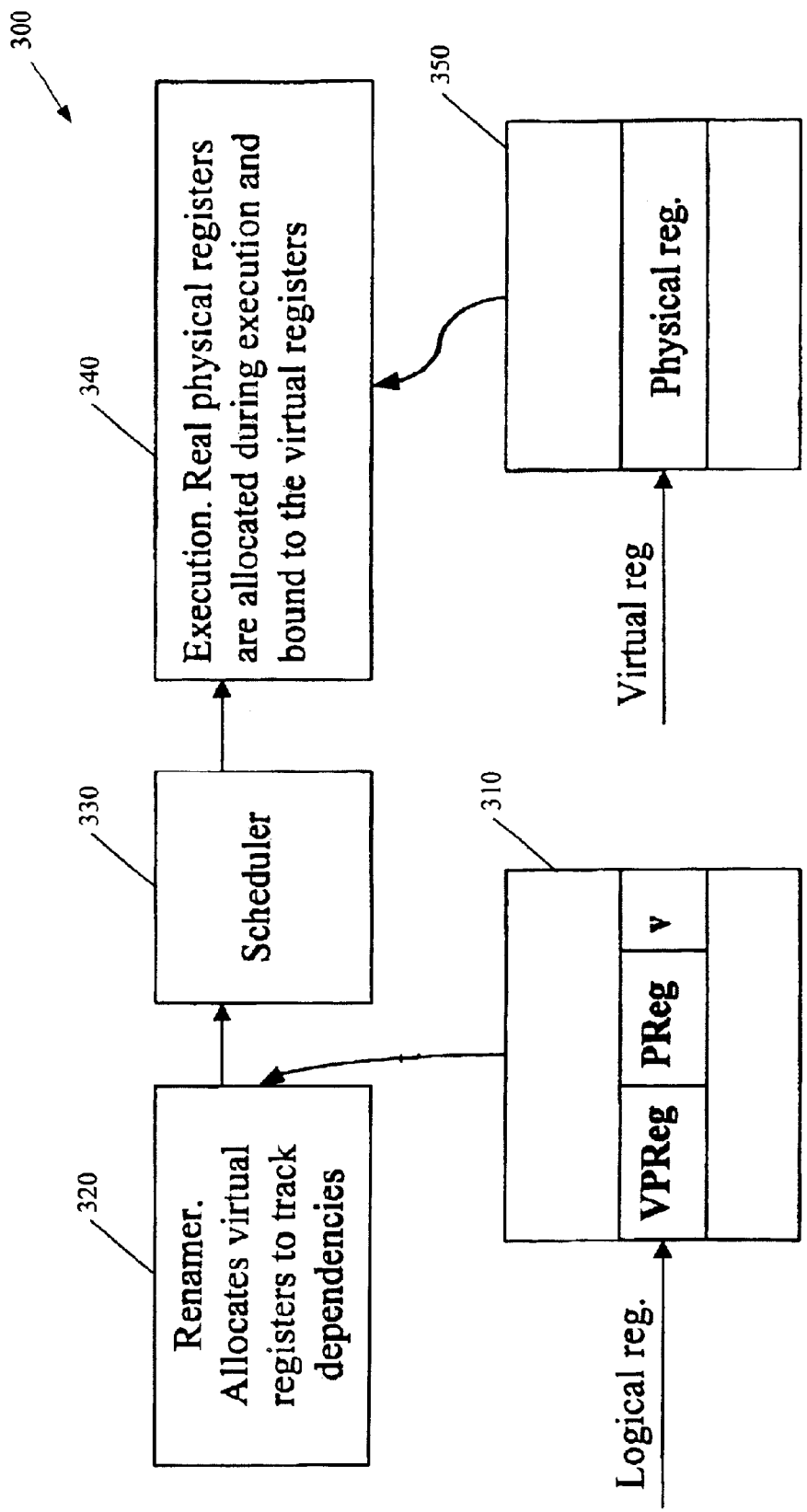
FIG. 3 shows an exemplary virtual renaming apparatus, method and system for use with the exemplary fast renamer apparatus, arrangement, method and system of FIG. 5 and/or FIG. 6.

Additionally, in FIG. 3 is shown an exemplary virtual renaming apparatus, arrangement method and system. A virtual-physical register is a name that may be used to identify a value that will be produced by an instruction(s) in the future, and therefore does not use any storage location. A virtual-physical register may be used to track dependencies among instructions. In contrast, physical registers are used to store the "live" values of instructions. Accordingly, virtual-physical registers are mapped to physical registers at some point in time. The virtual-physical register organization, however, may allocate a physical register for a shorter interval of time than for other available approaches. Virtual renaming is believed to have some advantages over the integer renamer including, for example, reducing register pressure and providing sequential allocation of the "virtual-physical" registers. An integer renamer may waste physical registers, since the physical registers may only be need to be allocated at the end of an execution stage when an instruction is written back. In short, the physical registers may spend most or at least some of their time in the pipeline unneeded. It is believed that another advantage of "virtual renaming" is that it provides an ability to allocate virtual registers sequentially, since virtual register IDs are only used for the uncommitted results or recently committed results.

The virtual-physical register organization adds another type of register, in addition to the logical and physical registers. The registers referenced by the instructions of the instruction set architecture (ISA) may be referred to as logical registers. When an instruction is decoded, its destination register is mapped to a new tag. The tags are not related to any physical storage location, and may therefore be referred to as virtual-physical registers (VP-Registers). When the instructions finish executing, a physical register is allocated for storing the result, and when the instruction is committed, the physical register allocated by the previous instruction with the same logical destination register becomes free. The virtual-physical register renaming approach may be used for integer registers and floating point registers.

The virtual-physical register organization may be implemented by using two register map tables, as shown in FIG. 3. A general map table (GMT) may be indexed by the logical register number and may include three fields, including a VP-Register field for indicating the last virtual-physical register to which the logical register has been mapped; a P-Register field for indicating the last physical register to which the logical and the virtual-physical registers have been mapped, if any; and a "v" (valid) bit field for indicating whether the P-Register field reflects a valid value (that is, whether a physical register has already been allocated to this logical register). The physical map table (PMT) includes an entry for each virtual-physical register, and it also includes the last physical register to which the virtual-physical register has been mapped. Alternatively, the physical map table may be implemented using a content-addressable-memory (CAM) with a number of entries equal to number of physical registers, which may be much lower than the number of virtual-physical registers. In addition, there is a group of free physical registers and a group of free virtual-physical registers.

The general map table (GMT) may have NLR rows, each row having $[\log_2 (NVR)+\log_2 (NPR)+1]$ bits, where NLR is the number of logical registers, NVR is the number of virtual-physical registers and NPR is the number of physical registers. (Note that if it is implemented using a CAM, the physical map table (PMT) may have NVR rows of $\log_2$ (NPR) bits each or NPR rows of $\log_2$ (NVR) bits each). Since virtual-physical registers are not related to any storage location, it is believed that the number of such registers should have a relatively small impact on the hardware cost. To better avoid having the processor "stalling", the number of virtual-physical registers NVR should at least be the same as the number of logical registers (NLR) plus the instruction window size; that is, the number of virtual-physical registers NVR determines the instruction window size.

For each new decoded instruction, its source operands are renamed either to virtual-physical registers or to physical registers if they are available. In particular, the general map table (GMT) accessed for each source register operand. If the "v" bit is set, the logical register is renamed to the physical register specified in the P-Register field. If not, the logical register is renamed to the virtual-physical register. The destination logical register (if any) is renamed to a free virtual-physical register. The corresponding entry of the general map table (GMT) may be updated by modifying the VP-Register field to reflect the new mapping and by resetting the "v" (valid) bit or field. The previous value of the VP-Register field is kept in the re-order buffer (ROB) to restore a precise state if there is a branch mis-prediction or an exception. The instruction is then dispatched to the instruction queue where it waits until it is issued, and to the re-order buffer (ROB) where it remains until it is committed.

An entry of the instruction queue may have the following fields: an Op code field for the operation code; a D field for the virtual-physical destination register; source Src1 and Src2 fields for the identifiers of the two source operands (for purposes of this explanation, it may be assumed that they are registers), where each identifier corresponds either to a virtual-physical register or to a physical register; register R1 and R2 field for indicating the ready bits of the source operands. When an operand is ready, the Src field may include a physical register identifier, and if not, it may include a virtual-physical register identifier.

An entry of the re-order buffer (ROB) may have the following fields: an L register field for indicating the destination logical register identifier; a C field for a single bit that indicates whether the instruction has completed its execution; and a VP-Register field for identifying whether the virtual-physical mapping of the last instruction had the same logical destination register.

An instruction may be issued when the R fields of both operands are set. It is believed that this should better ensure that the Src fields have physical register identifiers. When an instruction is issued, it reads its register operands from the physical register file using the Src identifiers of the corresponding entry in the instruction queue (if the operand is not forwarded from the output of a functional unit). Every instruction whose destination is a register allocates a new physical register when its execution is completed. At this time, a new physical register may be taken from a group of free physical registers. Next, the physical map table (PMT) may be updated to reflect the new virtual-physical to physical mapping. Also, the virtual-physical register identifier of the destination operand may be broadcast to all the entries in the instruction queue along with the physical register identifier. If there is a match in a Src field whose corresponding R bit is not set, this field may be updated with the physical register and the corresponding R bit may be set. The virtual-physical register and the associated physical register may also be broadcast to the general map table (GMT). Each entry may then compare its VP-Register identifier with the broadcast one, and the physical register identifier may be copied into the P register field and the "v" bit or flag may be set if there is a match. Thus, any new decoded instruction that uses such logical register should find the corresponding physical register in the general map table (GMT). Finally, the "C" flag of the corresponding entry of the re-order buffer (ROB) may be set.

When an instruction is committed, the virtual-physical register allocated by the previous instruction with the same logical destination register becomes free. This register may be identified by the VP field of the re-order buffer (ROB). The physical register allocated by that instruction may also become free. The identifier of such a register may be obtained using the physical map table (PMT) by indexing it with the VP-Register that is to be freed.

In the event of an exception or a branch mis-prediction, a precise state may be obtained by undoing the mappings performed by the instructions that follow the offending one. This may be done by removing the entries of the re-order buffer (ROB) from the newest up to the offending entry. For each instruction, the re-order buffer (ROB) may store the destination logical register and the previous virtual-physical register that was allocated to it. Using the logical register identifier, the general map table (GMT) may be accessed to obtain the current virtual-physical mapping. Additionally, the current physical mapping may also be obtained if the "v" bit flag of the general map table (GMT) entry is set. The current virtual-physical register and the physical register (if already allocated) may be returned to their corresponding free register groups. The VP-Register field of the general map table (GMT) entry may be restored with the VP field of the re-order buffer (ROB) (the previous virtual-physical mapping) and the physical mapping associated with any such register. Such physical mapping may be obtained from the physical map table (PMT). If the restored virtual-physical register is mapped to a physical register, the v-flag may be set. If not, the v-flag may be reset.

There may be, however, some complications in the virtual renaming scheme. First, there may be potentially increased execution latencies because of an extra access to get data from a physical register, since the physical map table, which is used to map "virtual" registers into physical registers, may require the extra access to translate a virtual register to a physical register. Bypasses, however, may be used to cover such latency so that there may be no actual latency increase. Also, a deadlock condition may occur when, for example, an old instruction is "stuck" in the scheduler (such as may occur, for example, due to a cache miss). When the instruction is ready, the physical registers may be consumed by prior "younger" instructions so that there is a deadlock condition. That is, the oldest instruction cannot retire because it cannot use the physical register destination, and prior younger instructions cannot release their physical registers because they cannot retire since the oldest instruction is unable to retire. Such a deadlock condition may be avoided by allocating at least n registers for use by only the n oldest instructions (where n is greater than or equal to one (1)).

Also, after an instruction is retired, there still may be some instructions in the system that depend on it and therefore receive the virtual ID (but not the physical register) as their source. Since the virtual ID may be stale after the instruction is retired, this may result in a break in the "consistency" of the system. To compensate for this retirement issue, the system should "clean up" virtual IDs after the physical IDs are allocated. In particular, the system should update the register alias table (RAT) with the physical mapping of registers as soon as the instruction is retired (if the appropriate RAT entry has the same virtual ID as the retired instruction). Additionally, the system may also use a number that is approximately two (2) times or twice as many (and more) "virtual registers" than re-order buffer (ROB) entries to allow safe re-order buffer (ROB) cleanup from the stale virtual registers.

In particular, the virtual renamer arrangement, method and system 300 includes a general map table (GMT) for use as a virtual renaming map table or virtual register alias table (RAT) arrangement 310, a renamer block 320 for allocating virtual registers to track dependencies, a scheduler arrangement 330, an execution arrangement 340 for allocating real physical registers during execution so that they are allocated or bound to the virtual registers, and a physical map table (PMT) arrangement 350. The system provides logical register information to the virtual renaming map table 310 (which based on the virtual physical register VPR, the physical register PReg and/or the virtual "v" flag or indicator) provides the information to the renamer block 320, which is coupled to and provides the virtual allocation renaming information to the scheduler arrangement 330. As shown, the physical map table arrangement 350 receives virtual register information, and provides the corresponding physical register PReg information to the executing and allocating arrangement 340.

Figure 4:
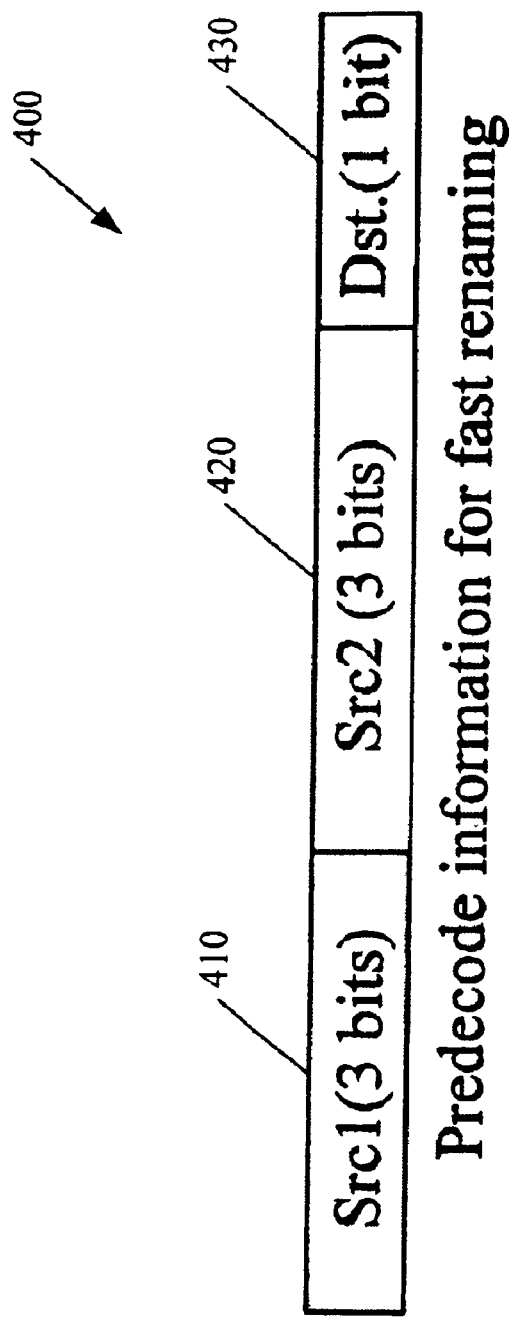
FIG. 4 shows exemplary cached instruction dependency information (information stored in the trace cache) for use with the exemplary fast renamer apparatus, arrangement, method and system of FIG. 5 and/or FIG. 6.

In connection with the foregoing, the fast renaming apparatus, arrangement and/or method may be described as follows. If the starting address is fixed (as may be the case, for example, with a trace cache), the dependency chain information is believed to be relatively static across a cache line, but does depend on conditional branches. In particular, for a trace cache, the dependency information is almost all or essentially all static. A branch mis-predict may occur when the system mis-predicts the next instruction information, which ends the tracing of the instructions in a trace cache. Accordingly, the dependency information may be cached to eliminate the use of the prioritized content-addressable-memories (CAMs) with the renamer arrangement and/or method of FIG. 2. Caching the dependency chain information is believed to be effective for providing sequential allocation, and may be done using the dependency information field arrangement 400 of FIG. 4. In the field arrangement 400, the first source (Src1) 410 and the second source (Src2) 420 information are provided using three (3) bits and the destination field (Dst) 430 is provided using one (1) bit, which collectively provides the cached dependency chain information for use in the fast renaming apparatus, method and system of FIGS. 5 and 6.

Figure 5:
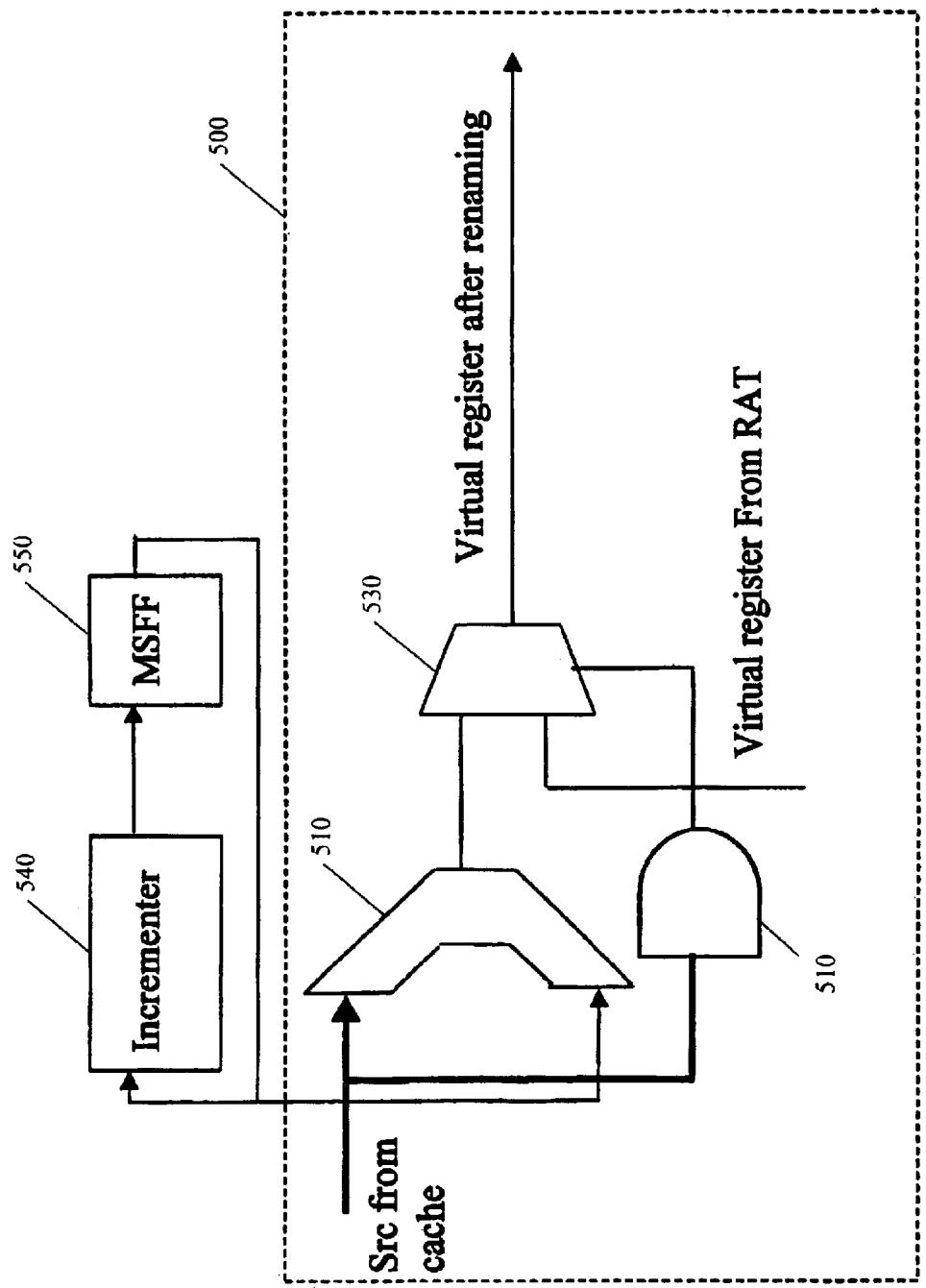
FIG. 5 shows a fast renamer arrangement and method according to an exemplary embodiment of the present invention, and using the exemplary cached instruction dependency information of FIG. 4.

In particular, in the pre-decode information for providing fast renaming, the first source Src1 bits and the second source Src2 bits indicate upon which instruction in the rename window the particular instruction depends. A special encoding (such as, for example, '111) may indicate or otherwise denote that the specific source Src is not produced by any previous instruction in the rename window. The destination Dst bit indicates that this instruction updates the register alias table (RAT). Using this pre-decode information, the content-addressable-memories (CAMs) may be replaced by an "adder" or concatenating arrangement as shown in FIG. 5. The fast renaming algorithm depends on sequential ID allocation for the renamed instructions. In particular, the system may determine a final virtual ID by concatenating the upper bits from the renamer with the lower bits from the instruction cache. It is believed that the latter approach may be faster and/or easier to implement, but may require allocation of virtual registers in larger, pre-defined groups having a size that depends on a power of 2.

In the fast renamer arrangement 500 of FIG. 5, to build the pre-decode information for the fast renamer approach 500, the exemplary renamer arrangement and method 200 of FIG. 2 may be used. The last bits of renamed physical source (PSrcs) from the renamer are encoded when they are from the register alias table (RAT), and are not encoded if they correspond to one of the renamed instructions from the rename window. Also, the register alias table (RAT) update may can be extracted from the renamer 200 for caching. The fast renamer arrangement and/or method 500 may be used with the fast renamer method and/or system 600 of FIG. 6. It is believed that the fast renamer system 600 should operate well using virtual renaming because the virtual renamer may allocate sequential physical register destinations (PDsts) for the instructions in the rename window.

In particular, an additive or fast renamer arrangement and method 500 may be used for each logical source (LSrc). Accordingly, for two logical sources 1 and 2 for an instruction, there should be two corresponding additive or fast renamer arrangements for allocating a register to each of the two sources. As shown, the source (Src) or dependency chain information from an instruction or trace cache is provided to an adder, combining or concatenating arrangement 510 and to a logical arrangement 520. The outputs of the adder, combining or concatenating arrangement 510 and the logical and arrangement 520 are coupled to a multiplexing arrangement 530, which receives virtual register information from the register alias table (RAT). Since the source information Src may be three bits, for example, each of the input lines into the adder or combining arrangement 510 and the logical and arrangement 520 may include three lines. An incrementer arrangement 540 may be an eight-bit incrementer that increments the upper eight bits provide to the adding, combining or concatenating arrangement 510. The incrementer arrangement 540 also outputs a one (1) bit indication to a master-slave flip-flop arrangement 550, the output of which is coupled back to the inputs of the incrementer arrangement 540. When an instruction arrives or is otherwise received, the flip-flop arrangement 550 "opens" the clocked logic.

Figure 6:
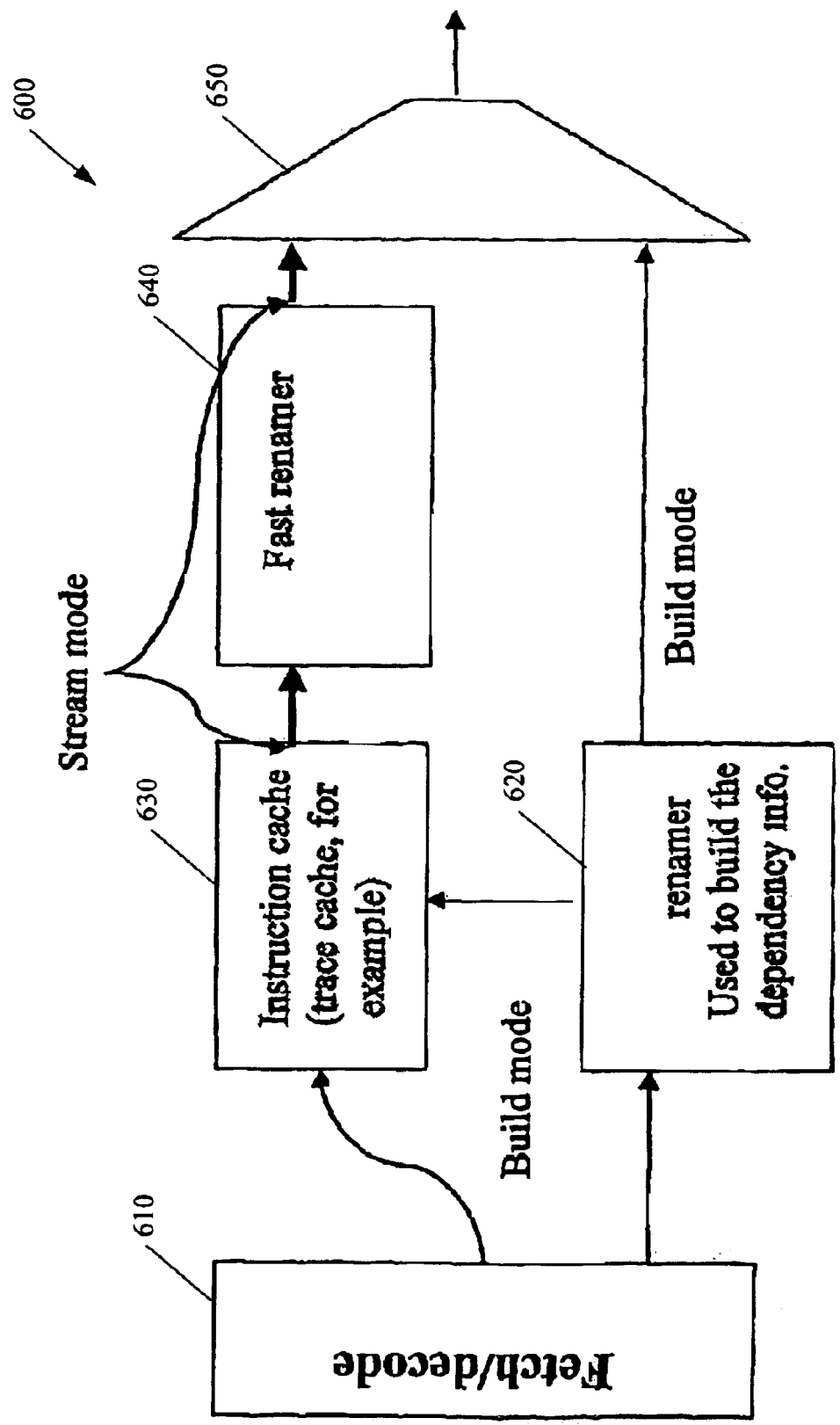
FIG. 6 shows another fast renaming apparatus, method and system according to another exemplary embodiment of the present invention using the apparatuses, arrangements, methods and systems of FIGS. 2 to 5, in which the virtual renaming apparatus, method and system may be used to allocate sequential Physical Destination Registers (PDsts) for the instructions, in the rename window.

In the exemplary fast renamer apparatus, method and system of FIG. 6, the fetch/decode arrangement 610 corresponds to the fetch/decode arrangement 250 of FIG. 2. Also, the integer renamer arrangement and/or method 200 of FIG. 2 (excluding the fetch/decode arrangement 250) may be used for the build dependency information and renamer arrangement 620 for building the dependency chain or program instruction flow information. The fetch/decode arrangement 610 provides the fetched and decoded instructions to the instruction cache or trace cache arrangement 630 and to the integer renamer 620. The build dependency information and renamer arrangement 620 may provide the lower bits (such as, for example, three bits) of the instruction dependency chain information to the instruction or trace cache arrangement 630. As shown, in a build mode, the fetched and decoded instructions are provided to the build dependency chain information and renamer arrangement 620, which provides the dependency information to a multiplexing arrangement 650. In a stream mode, the fetch/decode arrangement 610 provides the fetched and decoded instructions to the instruction or trace cache arrangement 630, which, as discussed, also receives the instruction dependency chain information from the build dependency information and renamer arrangement 620. The instruction cache or trace cache 630 provides the instruction cache information to the fast renamer arrangement 640 (which may use the exemplary fast renamer arrangement and/or method of FIG. 5). The fast renamer arrangement 640 and the dependency chain information are then provided to the multiplexing arrangement 650, which provides a renamed physical source.

Thus, as discussed herein, by combining the use of a trace cache and virtual renaming, it is believed that renaming speeds may be improved. As described, this involves performing renaming within a trace when building the trace of an instruction and using relative virtual renamed register numbers. Sources generated from previous traces may be renamed using the register alias table (RAT) (in the suitably appropriate ways described herein) when the trace is fetched, and sources generated with the trace are updated by adding, logically OR-ing, concatenating or otherwise combining the relative virtual register number to a base of allocated virtual register numbers. By using the exemplary embodiments and exemplary method described herein, it is believed that a larger number of registers may be virtually allocated and renamed every cycle, which it is believed should increase the instruction bandwidth out of the trace cache.

Accordingly, described herein is a method for renaming a source for use with a processor, the method including: providing at least one instruction; building instruction dependency information based on the at least one instruction; caching the at least one instruction with the instruction dependency information to provide cached instruction information; renaming a register based on the cached instruction information to provide a renamed register; and multiplexing the instruction dependency information and the renamed register to rename the source.

Still further described herein is a system for renaming a source for use with a processor, the system including: a fetch and decoding arrangement for fetching and decoding at least one instruction from the processor; a build-instruction-dependency arrangement for building instruction dependency information based on the at least one instruction; an instruction cache arrangement for caching the at least one instruction with the instruction dependency information to provide cached instruction information, the build-instruction-dependency arrangement providing the instruction dependency information to the instruction cache arrangement; a renamer arrangement for renaming a register based on the cached instruction information and for providing a renamed register; and a multiplexing arrangement for multiplexing the instruction dependency information and the renamed register and for providing a renamed source.

Also described herein is a system for renaming a source for use with a processor, the system including: means for fetching and decoding at least one instruction from the processor; means for building instruction dependency information based on the at least one instruction; means for caching the at least one instruction with the instruction dependency information and for providing cached instruction information, the means for building instruction dependency information providing the instruction dependency information to the means for caching the instruction; means for renaming a register based on the cached instruction information and for providing a renamed register; and means for multiplexing the instruction dependency information and the renamed register and for providing a renamed source.

Still further described herein is a set of instructions residing in a storage medium, said set of instructions capable of being executed by a processor to implement a method for renaming a source for use with a processor, the method including: providing at least one instruction; building instruction dependency information based on the at least one instruction; caching the at least one instruction with the instruction dependency information to provide cached instruction information; renaming a register based on the cached instruction information to provide a renamed register; and multiplexing the instruction dependency information and the renamed register to rename the source.

In short, is believed that the exemplary fast renaming apparatus, arrangement, method and system described herein may provide the benefit of improved renaming bandwidth, and it is also believed that this benefit may be used, for example, to increase processor performance by increasing the active instruction window size or by reducing the hardware cost by reducing the amount of storage require for register renaming.

What is claimed is:

1. A method for renaming a source for use with a processor, the method comprising:
    providing at least one instruction;
    building instruction dependency chain information based on the at least one instruction;
    caching the at least one instruction with only the instruction dependency chain information to provide cached instruction information;
    renaming a register based on the cached instruction information to provide a renamed register; and
    multiplexing the instruction dependency chain information and the renamed register to rename the source.

2. The method of claim 1, wherein the cached instruction information includes first source information, second source information and destination information.

3. The method of claim 2, wherein the first source information includes three bits, the second source information includes three bits, and the destination information includes one bit.

4. The method of claim 1, wherein the first source information and the second source information denote a rename window instruction from which the at least one instruction depends.

5. The method of claim 1, wherein a virtual ID is formed by at least one of adding, combining, concatenating or logically OR-ing upper bits from a renamer with lower bits from an instruction cache.

6. The method of claim 1, wherein:
    the first source information includes three bits, the second source information includes three bits, and the destination information includes one bit;
    the first source information and the second source information denote a rename window instruction from which the at least one instruction depends; and
    a virtual ID is formed by at least one of adding, combining, concatenating or logically OR-ing upper bits from a renamer with lower bits from an instruction cache.

7. The method of claim 6, wherein the processor is a microprocessor.

8. The method of claim 1, wherein the instruction dependency chain information indicates upon which other instruction the at least one instruction depends.

9. The method of claim 1, wherein the renamed register is a virtual renamed register.

10. The method of claim 9, wherein the virtual renamed register refers to a value that is to be produced in the future by the at least one instruction.

11. The method of claim 2, wherein the first and second source information each include exactly three bits.

12. The method of claim 2, wherein the destination information includes exactly one bit.

13. The method of claim 1, wherein pre-decode information indicates upon which instruction in a rename window a particular instruction depends.

14. A system for renaming a source for use with a processor, the system comprising:
    a fetch and decoding arrangement for fetching and decoding at least one instruction from the processor;
    a build-instruction-dependency arrangement for building instruction dependency chain information based on the at least one instruction;
    an instruction cache arrangement for caching the at least one instruction with only the instruction dependency chain information to provide cached instruction information, the build-instruction-dependency arrangement providing the instruction dependency chain information to the instruction cache arrangement;
    a renamer arrangement for renaming a register based on the cached instruction information and for providing a renamed register; and
    a multiplexing arrangement for multiplexing the instruction dependency chain information and the renamed register and for providing a renamed source.

15. The system of claim 14, wherein the cached instruction information includes first source information, second source information and destination information.

16. The system of claim 15, wherein the first source information includes three bits, the second source information includes three bits, and the destination information includes one bit.

17. The system of claim 14, wherein the first source information and the second source information denote a rename window instruction from which the at least one instruction depends.

18. The system of claim 14, wherein a virtual ID is formed by at least one of adding, combining, concatenating or logically OR-ing upper bits from a renamer with lower bits from an instruction cache.

19. The system of claim 14, wherein:
the first source information includes three bits, the second source information includes three bits, and the destination information includes one bit;
the first source information and the second source information denote a rename window instruction from which the at least one instruction depends; and
a virtual ID is formed by at least one of adding, combining, concatenating or logically OR-ing upper bits from a renamer with lower bits from an instruction cache.

20. The system of claim 19, wherein the processor is a microprocessor.

21. A system for renaming a source for use with a processor, the system comprising:
means for fetching and decoding at least one instruction from the processor;
means for building instruction dependency chain information based on the at least one instruction;
means for caching the at least one instruction with only the instruction dependency chain information and for providing cached instruction information, the means for building instruction dependency chain information providing the instruction dependency information to the means for caching the instruction;
means for renaming a register based on the cached instruction information and for providing a renamed register; and
means for multiplexing the instruction dependency chain information and the renamed register and for providing a renamed source.

22. The system of claim 21, wherein the cached instruction information includes first source information, second source information and destination information.

23. The system of claim 22, wherein the first source information includes three bits, the second source information includes three bits, and the destination information includes one bit.

24. The system of claim 21, wherein the first source information and the second source information denote a rename window instruction from which the at least one instruction depends.

25. The system of claim 21, wherein a virtual ID is formed by at least one of adding, combining, concatenating or logically OR-ing upper bits from a renamer with lower bits from an instruction cache.

26. The system of claim 21, wherein:
the first source information includes three bits, the second source information includes three bits, and the destination information includes one bit;
the first source information and the second source information denote a rename window instruction from which the at least one instruction depends; and
a virtual ID is formed by at least one of adding, combining, concatenating or logically OR-ing upper bits from a renamer with lower bits from an instruction cache.

27. The system of claim 21, wherein the processor is a microprocessor.

28. A set of instructions residing in a storage medium, said set of instructions capable of being executed by a processor to implement a method for renaming a source for use with a processor, the method comprising:
providing at least one instruction;
building instruction dependency chain information based on the at least one instruction;
caching the at least one instruction with only the instruction dependency chain information to provide cached instruction information;
renaming a register based on the cached instruction information to provide a renamed register; and
multiplexing the instruction dependency chain information and the renamed register to rename the source.

29. The set of instructions residing in a storage medium of claim 28, wherein the cached instruction information includes first source information, second source information and destination information.

30. The set of instructions residing in a storage medium of claim 29, wherein the first source information includes three bits, the second source information includes three bits, and the destination information includes one bit.

31. The set of instructions residing in a storage medium of claim 28, wherein the first source information and the second source information denote a rename window instruction from which the at least one instruction depends.

32. The set of instructions residing in a storage medium of claim 28, wherein a virtual ID is formed by at least one of adding, combining, concatenating or logically OR-ing upper bits from a renamer with lower bits from an instruction cache.

33. The set of instructions residing in a storage medium of claim 28, wherein:
the first source information includes three bits, the second source information includes three bits, and the destination information includes one bit;
the first source information and the second source information denote a rename window instruction from which the at least one instruction depends; and
a virtual ID is formed by at least one of adding, combining, concatenating or logically OR-ing upper bits from a renamer with lower bits from an instruction cache.

34. The set of instructions residing in a storage medium of claim 33, wherein the processor is a microprocessor.

* * * * *